July 29, 1924.
J. E. WEBB
FISHHOOK
Filed June 11, 1923
1,503,400
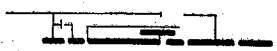
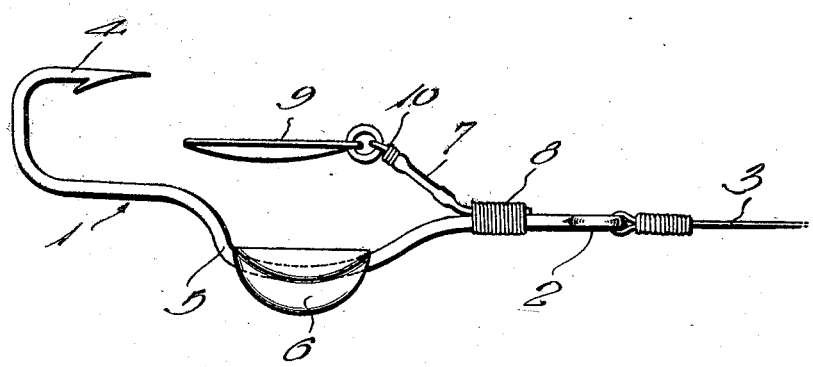
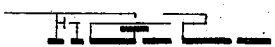
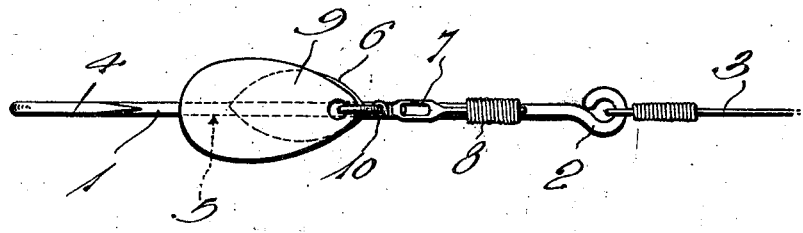
Witness
H. Woodard
Inventor
John E. Webb
By H. B. Wilson & Co.
Attorneys Patented July 29, 1924.

1,503,400

UNITED STATES PATENT OFFICE.

JOHN EVERETT WEBB, OF McGREGOR, IOWA.

FISHHOOK.

Application filed June 11, 1923. Serial No. 644,809.

*To all whom it may concern:*

Be it known that I, JOHN EVERETT WEBB, a citizen of the United States, residing at McGregor, in the county of Clayton and State of Iowa, have invented certain new and useful Improvements in Fishhooks; and I do declare the following to be a full, clear, and exact description of the invention, such as will enable others skilled in the art to which it appertains to make and use the same.

My invention relates to improvements in fish-hooks designed for trolling and has for one object to provide a simple and inexpensive hook of such construction that its free end will at all times be disposed upwardly when drawing it through the water, thus preventing it from catching in snags, to a large extent.

Another object of the invention is to provide the hook shank with a depressed portion carrying a sinker and with a spoon or other spinner mounted in front of the hook and above said depressed portion, thus producing the desired balance, locating the spinner at the most advantageous point, and permitting this spinner to revolve freely without striking the hook shank.

Another aim is to provide a hook and shank of such form that tension on the line will cause the hook to sink more deeply into the hard tissues or roof of the fish's mouth, when once caught in his mouth.

With the foregoing in view, the invention resides in the novel subject matter herein- after described and claimed, the description being supplemented by the accompanying drawing.

Figure 1 is a side elevation of a hook constructed in accordance with my invention.

Figure 2 is a top plan view.

The improved hook comprises a shank 1 which under ordinary circumstances extends in substantially a horizontal direction, the front end of said shank being provided with an eye 2 or other preferred means for attaching it to a line 3, while the rear end of the shank is formed with an upwardly and forwardly directed hook 4. Between its ends and at a point in advance of the hook 4, the shank 1 is depressed as indicated at 5 and this depressed portion rigidly carries a sinker 6 which also acts as a shoe to drag on the bed of a stream and slide freely along, without danger of hooking in any snags.

A rearwardly inclined spinner support 7 is secured to the shank 1 in advance of its depressed portion 5, a wrapping 8 being shown for this purpose. A spinner or spoon 9 is swiveled at 10 to the rear end of the support 7 and is positioned in front of the hook 4 and above the depressed shank portion 5. By positioning the spinner in this manner, not only will it be most effective by insuring that the hook will be caught in the fish's mouth when he attempts to swallow the spinner, but it will be seen that as the shank is depressed below the spinner, there is no danger of the latter striking said shank.

By providing the construction shown and described, or a substantial equivalent thereof, a hook is provided which will effectively fulfill the objects of the invention, and as excellent results have been obtained from the details disclosed, they may well be followed. However, within the scope of the invention as claimed, minor changes may be made.

I claim:

A fish hook having a horizontally elongated shank provided with an upwardly and forwardly turned hook at its rear end, said shank being depressed between its ends in front of said hook and having a sinker carried fixedly by its depressed portion, a spinner support secured to said shank in front of its depressed portion and extending rearwardly, and a spinner connected with said support over said depressed portion and in front of said hook.

In testimony whereof I have hereunto affixed my signature.

JOHN EVERETT WEBB.